Oct. 7, 1958 R. W. STENZEL 2,855,357
CHEMICAL REFINING OF OILS
Filed April 10, 1952 3 Sheets-Sheet 1
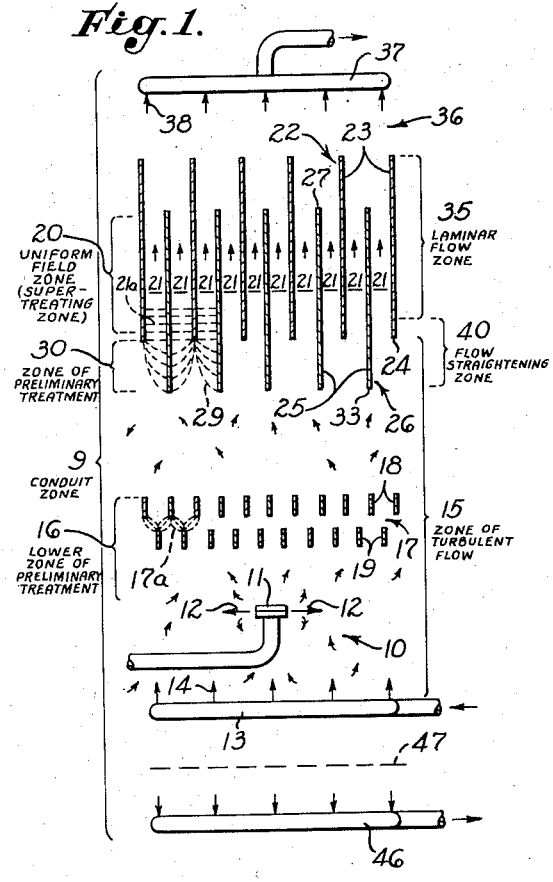
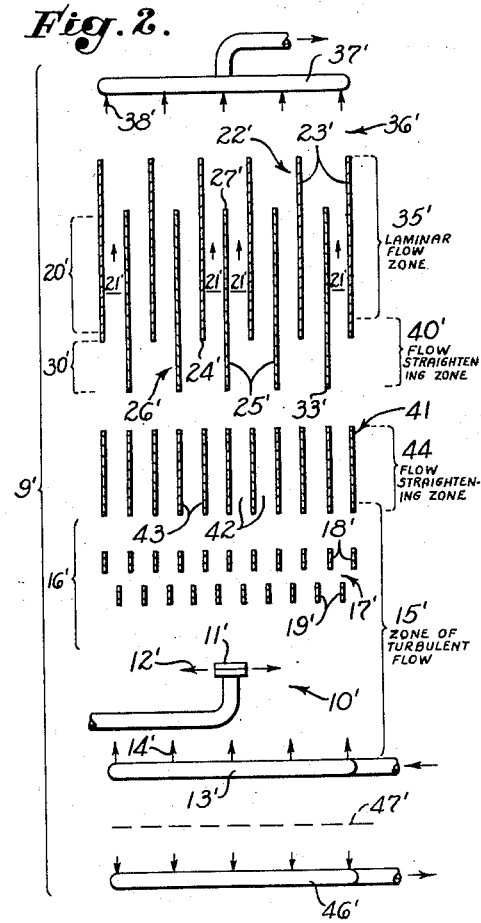
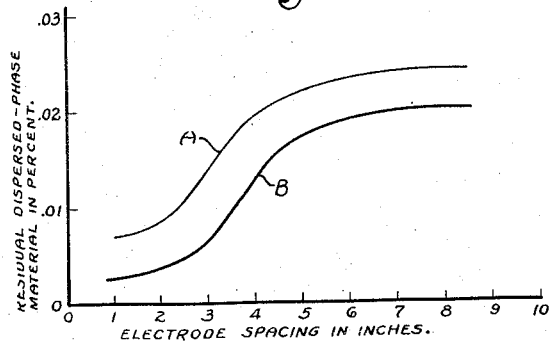
INVENTOR.
RICHARD W. STENZEL
BY HIS ATTORNEYS.
HARRIS, KIECH, FOSTER & HARRIS Oct. 7, 1958     R. W. STENZEL     2,855,357
CHEMICAL REFINING OF OILS
Filed April 10, 1952     3 Sheets-Sheet 3
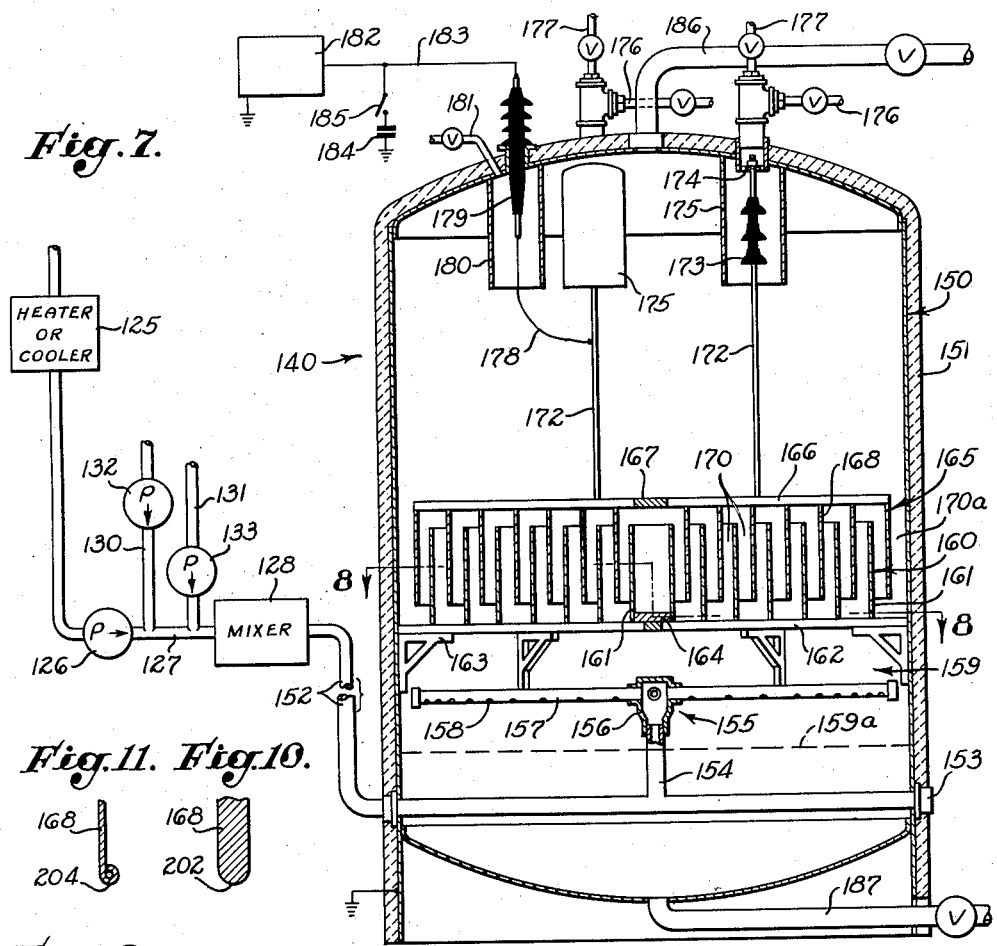
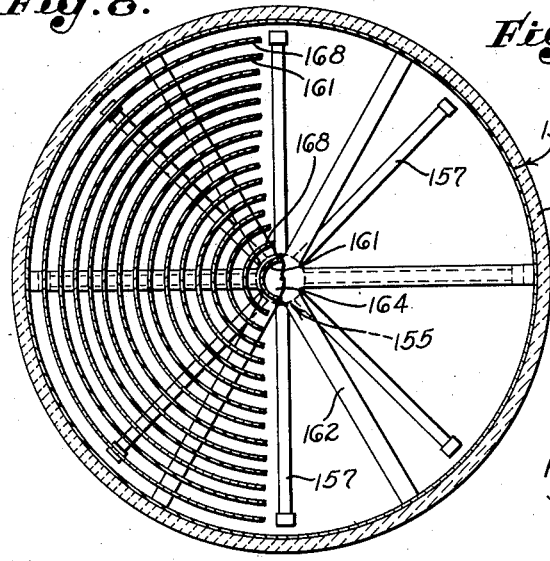
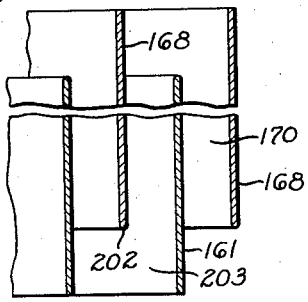
INVENTOR.
RICHARD W. STENZEL
BY HIS ATTORNEYS.
HARRIS, KIECH, FOSTER & HARRIS United States Patent Office 2,855,357
Patented Oct. 7, 1958

2,855,357

CHEMICAL REFINING OF OILS

Richard W. Stenzel, Palos Verdes Estates, Calif., assignor to Petrolite Corporation, Wilmington, Del., a corporation of Delaware Application April 10, 1952, Serial No. 281,542

10 Claims. (Cl. 204—190)

This invention relates to the chemical treatment of hydrocarbon oils, such as petroleum oils, shale oils, etc., and distillates and extracts derived therefrom. More specifically, it is concerned with the chemical refining of such oils as by acid and alkali treatment. The invention is concerned primarily with the electric and hydraulic features of a process and apparatus for treating such aforementioned oils and with processes and apparatus for forming emulsions or dispersions suitable for such treating process and apparatus.

Many petroleum products are refined by treatment with concentrated sulfuric acid to improve their quality such as by the removal of unsaturates, polymerizable material, color bodies, etc. Conventionally, this is achieved by mixing the acid with the oil and allowing the acid phase, containing dissolved and/or reacted materials, to separate from the mixture. Sometimes the mixture is passed through towers packed with granular inert material in order to facilitate the separation. However, this method has the deficiency of permitting relatively long-time contact between the acid sludge and the oil, thereby promoting re-solution of some of the reaction products in the oil phase due to aging effects, etc.

In other instances, a small amount of water is added to the acid-oil mixture to produce a so-called "coking" effect, which tends to precipitate the acid sludge more rapidly than is otherwise possible. Such coking procedure has the disadvantage of causing some constituents of the sludge to be re-dissolved in the oil, thereby degrading its quality.

If the acid treatment procedure is carried out without the aforementioned separating aids, the separation of acid sludge from the oil is usually incomplete, and a small but deleterious amount of "pepper sludge" is carried over with the treated oil.

In the conventional processes, it is also usually found that the sludge separated from the acid-oil mixture carries with it some entrained oil which is thereby lost in the form of a degraded oil, if it can be recovered at all.

In order to avoid the carryover of acid into the treated oil and the entrainment of oil in the acid sludge, it is necessary to use comparatively mild agitation when using the conventional separating processes. This reduces the efficiency of the acid treatment since contact between the acid and the oil is then not sufficient to attain the maximum solution and reaction effects between the two phases.

The acid treating process is often followed by alkali treating steps designed to neutralize residual acid carryover in the oil or to remove organic acids from the oil. In some cases, an oil is treated preliminarily with alkali to remove organic acids such as naphthenic acids for the purpose of improving oil quality or recovering these acids for commercial use. In such alkali treating, the distillate is usually mixed with a sodium hydroxide solution which reacts with the acidic constituents of the oil, after which the two phases are separated. In this case also it is necessary to employ comparatively mild mixing procedures in order to minimize the amount of alkali solution carried over with the separated oil, and to prevent excessive entrainment and consequent loss of oil in the alkali phase.

Some of the deficiencies of the conventional chemical refining processes enumerated above are as follows: (1) Excessive overhead carryover of reaction products with the treated oil. (2) Excessive entrainment of oil in the reagent (i. e., acid or alkali) phase separated from the oil. (3) Inefficient mixing or waste of reagent. (4) Excessive time of contact between the reagent and the oil. (5) Re-solution of undesirable constituents from the reagent phase into the treated oil. (6) Degrading of the quality of the treated oil, etc.

In some cases, the refiner is able to mitigate one or more of the above objectional features but usually finds that this can be done only by increased adverse effects of some of the others. For example, if he wishes to improve the efficiency of contact by more intense emulsification, he will find that the overhead carryover and oil entrainment in the reagent phase are thereby increased. In such cases, he will be required to wash out the reagent left in the treated oil, thereby adding one or more additional steps to the process.

It is an object of this invention to provide a process for the chemical refining of oil with acids or alkalies, the process having novel electrical and hydraulic features which will overcome or mitigate the objectional features of the conventional processes outlined above.

Further, it is the object of the invention to provide improved alkali processes for the treatment of oils utilizing the procedures described hereinafter.

A commercially successful electric process and apparatus for treating artificially-produced oil-in-water emulsions has been described in U. S. Patent No. 2,182,-145 to H. C. Eddy. However, I have found that when this or similar processes and apparatus are used in an attempt to treat emulsions of the type here involved, consisting of oil mixed with acid or alkali, the results are not greatly superior to conventional processes employing gravitational separation only. These prior electric processes employ high-voltage alternating-current fields concentrating at edges of the electrodes and teach the use of a high degree of turbulence in the electric field in order to avoid short-circuit currents and sludge formation. I have found that super-treating unidirectional electric fields of the character to be defined give unexpected results in the acid-treating or alkali-treating of oils. For example, it has been determined that the electric field should be applied in a certain way and that the hydraulic conditions should be carefully regulated in order to obtain the especially high degree of acid and alkali removal from an oil emulsion obtainable with my process. Thus, I have found that it is possible to establish super-treating electric fields to obtain greatly superior results in the treatment of acid and alkali emulsions, but that such fields should have definite characteristics and that the emulsion flowing through these super-treating fields should do so under certain hydraulic conditions and with certain maximum dispersed-phase contents. In this way, my process enables me to produce results which are much superior to those possible with conventional methods or with such methods when used in conjunction with conventional electric apparatus and processes.

Further objects of the invention are: To provide a novel method and apparatus for the chemical treatment of oils with concentrated acid and with alkaline solutions whereby the previously described super-treating action is obtained and in which some or all of the herein recited advantages are obtainable; to establish a super-treating electric field in which the electric gradients are substantially uniform and flow of the emulsion is substantially non-turbulent; to eliminate internal recirculation of the oil through any super-treating field; to limit the content of the dispersed acid or alkali to a low value at the time the emulsion enters the super-treating fields; to preliminarily treat the emulsion before entry into the super-treating fields to remove a portion of the dispersed acid or alkali therefrom if the content thereof is unduly high; to treat the emulsion while advancing forwardly as a plurality of small streams flowing along the super-treating zones; to move the emulsion preferably at substantially equal forward velocities from one zone of the treater to another; to flow a conduit-filling, container-filling or passage-filling stream forwardly from an entrance zone through a grid of inter-spaced electrodes to an exit zone; to split such large stream into a plurality of streams flowing side-by-side and to separately treat such streams; to employ flow-straightening means to eliminate substantially all turbulence in the large stream before or during entry into or passage through the super-treating zones; to flow substantially all filaments of the cross section of the conduit-filling stream in a forward direction during the super-treating action while avoiding flows or currents transverse to the direction of flow; to effect the super-treating action in a field of substantially uniform voltage gradient measured along the lines of force of the field; to establish the super-treating field between electrodes sufficiently smooth that there are no appreciable localized field concentrations present in the super-treating zones at distances from the electrodes more than a small fraction of the electrode separation; to dispose a non-uniform gradient field at the entrance end of the super-treating zones; and to control the treatment so that the treated oil issuing from the super-treating zones contains less than about one-half as much residual dispersed acid or alkali as would be possible in an electric treatment of the same emulsions by conventional treaters not having the super-treating zones and their specific electric and hydraulic characteristics as herein described.

A further object is to combine a conventional high-voltage electric treating process with a super-treating process by which acid-oil or alkali-oil mixtures can be electrically treated and by which results far superior to either process used separately can be obtained.

Another object is to subject an acid-oil or alkali-oil emulsion first to a high-voltage field of the non-short-circuiting type and then to a super-treating electric field of the type herein described; also to provide treating methods and apparatus of a character specified in each of the claims presented herein.

It is another object of this invention to treat an oil sequentially with a concentrated acid and with an alkaline solution by means of the novel process and/or apparatus herein described.

Another object of this invention is to emulsify a concentrated acid with an oil, using intense mixing so that intimate contact is made between the two liquids and so that the reaction and solution processes are rapidly carried forward.

Another object of the invention is to emulsify relatively intensely an alkaline solution with an oil, so that intimate contact is made between the two liquids, and so that a rapid and high efficiency of utilization of the alkali is possible.

Further objects and advantages of the invention will be evident to those skilled in the art from the herein-contained description of exemplary embodiments.

Within the meanings of the terms as herein used with reference to the invention, the following definitions should be considered:

The term "emulsion" has reference to the oil-continuous mixture or dispersion that is produced when the oil to be treated is mixed with the acid or alkaline refining reagent. The continuous phase is a hydrocarbon oil, usually a distillate or extract derived from a petroleum oil. The dispersed phase is composed of dispersed particles or droplets resulting, in this process, from the action of the reagent on the oil to be treated. The reagent may react with or selectively combine with impurities or components of the oil. In the treatment with strong mineral acids, the dispersed particles are particles of acid sludge with little or no water present therein. In the treatment with aqueous alkaline solutions, the dispersed particles are aqueous and contain reaction products, being often organic soap stock particles resulting from the reaction between the alkali and organic acidic components of the oil or inorganic salts resulting from the reaction of the alkali with residual acid particles remaining after acid treatment. The invention is concerned with emulsions containing dispersed particles of dielectric constant differing from the oil of the continuous phase to be coalesceable in a high-voltage electric field; further, the particles should be of a different specific gravity than the oil so that the coalesced masses are gravitationally separable therefrom. Initially, however, the dispersed particles are of a character not to separate readily and completely from the oil in any commercially-reasonable time, sedimentation being slow because of minute particle size, interfacial stabilization, low concentration resulting in wide spacing, etc.

The term "coalesce" as used in describing and claiming the present invention refers to the bringing together or agglomerating of dispersed particles while in situ in the oil phase and as a result of electrical action to produce masses of sufficient size to separate from the oil phase by difference in specific gravity. The bringing together or agglomerating of two or more fluid droplets usually results in a disruption of their protective interfacial films, membranes or molecular layers to result in a single larger droplet surrounded by a single and more extensive interfacial film, membrane or molecular-layer structure. On the other hand, the bringing together or agglomerating of dispersed droplets or particles may be more of an adhesion thereof with little or no disruption of interfacial films, membranes or molecular layers, the resulting mass being separable from the oil by difference in specific gravity. Such term "coalesce" or "coalescence" is used with reference to either type of action.

Referring to the drawings:

Figs. 1 and 2 are diagrammatic views illustrating the principles and mode of operation of the invention in its preferred practice;

Figs. 3 and 4 diagrammatically illustrate flow conditions in a relatively narrow and a relatively wide treating space;

Fig. 5 is a graphical representation illustrating treating efficiencies at different electrode spacings;

Figs. 6 and 7 are vertical cross-sectional views of two embodiments of a complete electric treater employing the principle and mode of operation suggested in Figs. 1 and 2;

Fig. 8 is a horizontal sectional view taken along the line 8—8 of Fig. 7;

Fig. 9 is an enlarged detail, in section, of the electrodes in Fig. 7;

Fig. 10 is a greatly enlarged view of one of the electrodes of Figs. 7 and 9; and Fig. 11 is an enlarged sectional view of an alternative lower edge of such electrode.

Figure 6:
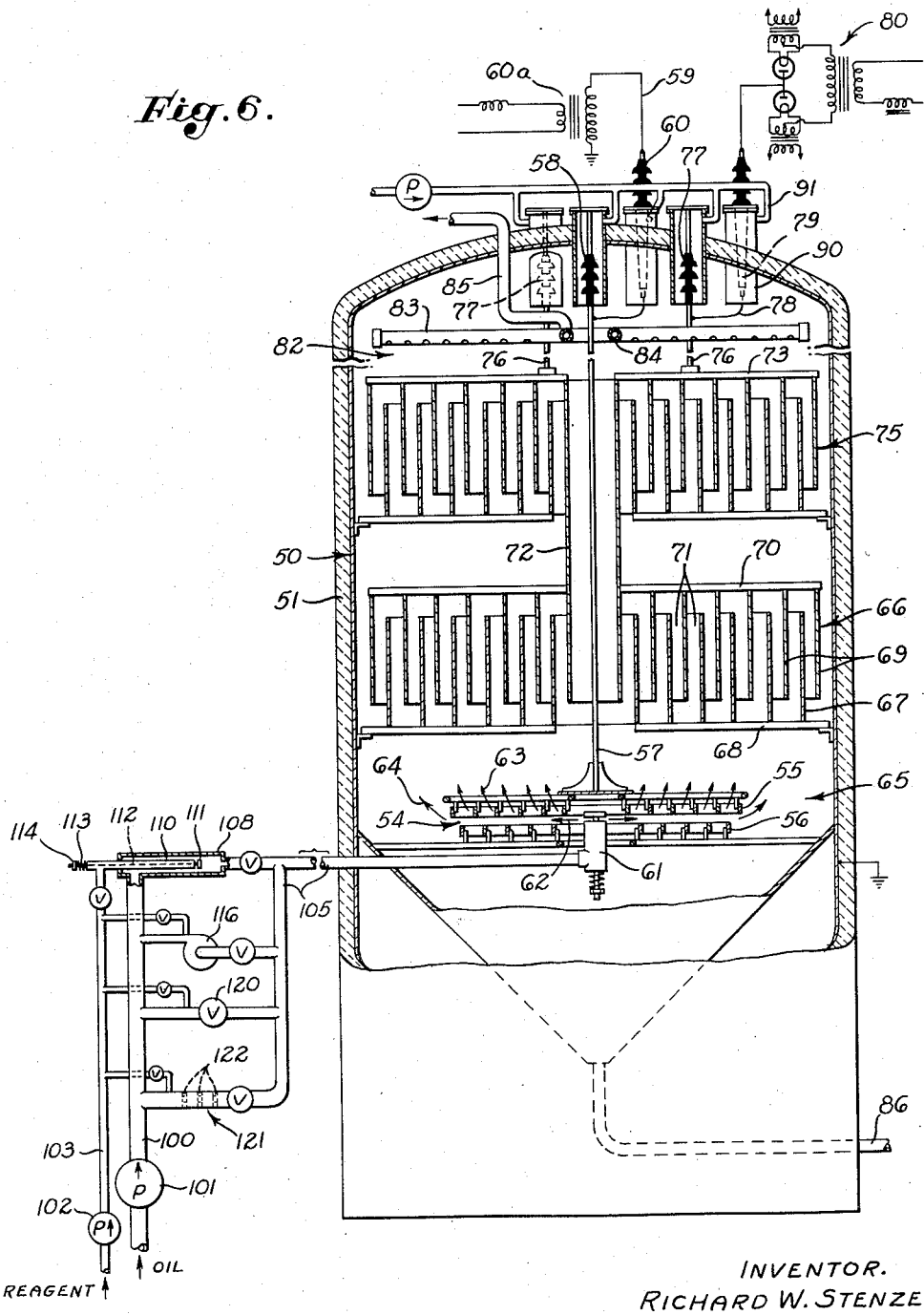

Because each of the embodiments of the invention involve as a first step the formation of an acid-oil or alkali-oil emulsion, the mixing requirements of the two systems and general considerations concerning the amount and character of the reagents used will first be generally discussed.

The acid treatment of this invention contemplates the use of strong mineral acids in concentrated form, such as sulfuric acid in the range of about 80% to the oleums. The amount of acid used is usually varied to suit the degree of refinement required for the particular oil stock being treated. After injecting the acid into the oil it is necessary to provide a mixing means which intensely emulsifies the acid and oil to form finely dispersed droplets of acid in the oil. By so doing, rapid reaction between the two phases is possible, and whatever chemical and/or physical solution changes are involved can quickly take place. In this way it is possible to mix the oil with the acid just prior to subjecting it to the electric treating field of this invention, thereby desirably minimizing the time of contact between the acid and the oil and obtaining superior oil quality as well as avoiding an aging effect on the sludge while in intimate contact with the oil. It has been found that extended oil-sludge contact tends to degrade the oil and to cause the sludge to become more viscous and of less economic value. If intense mixing such as my process contemplates is used in conventional settling processes, extended time periods are required to obtain any remotely satisfactory separations, thereby increasing the cost of the process in addition to degrading the products as mentioned above.

I have found that a satisfactory method of obtaining intense emulsification of the acid with the oil is to pass the preliminary mixture, obtained by continuously injecting the acid into the oil stream, through a motor-driven centrifugal pump which is throttled to increase the internal turbulence, or which is inverted so that the mixture is forced into its discharge and flows out through its suction. Such intense mixing permits rapid and efficient contact of the acid with the oil and is followed by the prompt action of the electric field of my invention in again separating the phases.

Some acid-oil systems which are easily emulsified may be adequately mixed by the use of conventional emulsifying valves, using high pressure drops, but in general I have found these to be inadequate for the purpose.

In the case of the treatment of oils with alkaline solutions, the alkali most commonly used is caustic soda, but others of equivalent chemical effect, such as caustic potash, may be used. I prefer to use aqueous solutions of concentrations in the range of 0.2 to 2N, and more particularly about 0.5N to 1N, in order to avoid the formation of "inverse phase" emulsions, or sludges, which occurs when more dilute solutions are used, and the tendency for soaps to be "salted out" into the oil with the more concentrated solutions.

In order to obtain the most efficient use of the alkali in reacting with the oil constituents, it is necessary that intimate contact be made between the two phases. However, the mixing of these alkaline systems can usually not be so violent as the acid mixtures described above, because of the formation of "inverse phase," i. e., oil-in-water type of systems, which are not amenable to treatment by the electric fields. I have found that intimate contact is obtainable without adverse effects if the alkaline solution is sprayed into the flowing oil stream by means of a distributor providing a narrow opening of considerable length, as by the injector apparatus to be described. Centrifugal pumps usually cause treating difficulties and are therefore not desirable. Due to the high coalescing effectiveness of my process, intimate contact between the alkali and oil can be utilized, such as by an injector means, thereby making it possible to use only the amount of caustic required to complete reaction with the desired oil constituents. In older processes where more gentle agitation had to be used in order to obtain reasonably good separation of the phases, an excess of caustic was required, and this in turn made the process not only more costly but tended to degrade the oil by a "salting out" effect on the soaps from the aqueous solution. Adequate emulsification may also be obtained by the use of multiple baffle mixers. Because of the rapid treatment possible with my process, aging effects due to extensive or prolonged contact between the phases are practically eliminated.

When the emulsions of acid or alkali with the oil have been properly prepared as described above, they are promptly introduced into an electric treater, being therein subjected to a particular electric treating process which is best understood in its principles and action by referring to Figs. 1 and 2.

Referring to Fig. 1, which diagrammatically illustrates some of the principles of the electric treating features of the invention and in large measure the mode of operation thereof, the equipment shown is such as would be used to treat a portion of the cross section of a fluid column of the acid or alkaline emulsion confined to move longitudinally along a zone 9 of a conduit, not shown, in a direction upwardly of the paper. The incoming emulsion is introduced into a transverse zone of a fluid-filled entrance zone 10 by means such as a distributor 11 discharging a sheet of the emulsion radially outwardly as suggested by the arrows 12 or a manifold-type distributor 13 which discharges the emulsion as a plurality of streams as suggested by the arrows 14. Other types of distributors can be used, but it is preferable that they discharge the emulsion at a plurality of positions in a transverse zone of the entrance zone so as to tend to produce a conduit-filling or passage-filling fluid column which advances at substantially equal velocity in the various zones which make up its cross section.

Any such introduction in commercial-sized conduits and at commercial rates inevitably creates a turbulence or eddies in most or all of a zone 15 representing a zone of turbulent flow. This turbulence is suggested diagrammatically by the numerous curved arrows. At the same time, continued introduction of the emulsion will establish a conduit-filling or passage-filling flow of the emulsion constituents moving generally forward along the zone 9 of the conduit in a direction upwardly of the paper, there being considerable lateral components of motion due to turbulent flow.

The emulsion introduced into the conduit is preferably subjected to a preliminary treatment while in the zone 15 designed to separate some of the dispersed material of the emulsion and to condition the emulsion for the super-treating action to follow. This may be accomplished in a lower zone 16 of preliminary treatment as by flowing the emulsion through an electric field in a treating space 17 bounded by conventional electrode configurations, such as between lower edges of a nest of concentric rings 18 and upper edges of a nest of concentric rings 19 or through any electric field below the rings 19 if the latter are at a potential above ground potential. Concentrated fields are here often desirable, the field concentrating at the edges of the electrodes, the field pattern in the treating space 17 being indicated by dotted lines 17a. The electric field established in the treating space 17 or below its lower electrode may be of the alternating-current or direct-current type, either being substantially equally satisfactory in this region of the treater. Any such field may have a configuration and voltage characteristic such as is conventionally used in older methods of electrically treating emulsions and is preferably made non-short-circuiting by high turbulence, jet action, non-uniform voltage gradients, edge-bounded fields, etc. The principal reason for subjecting the emulsion to a preliminary treatment, in the zone 16 or elsewhere, is to condition the emulsion for the later super-treating action and to reduce the amount of dispersed-phase material of the emulsion to a value of the order of 2% or less, in order to obtain maximum treating efficiency in the super-treating fields to which the emulsion is subsequently subjected. In many cases it is possible to omit the electrodes 18 and 19 if the emulsion already contains a low concentration of the dispersed-phase material or if sufficient of the dispersed-phase material gravitates from the emulsion in the zone 16 or if there is sufficient treatment in the zone 30 to be described.

The final or super-treatment of the emulsion is accomplished by its passage through a uniform field zone 20 made up of a plurality of side-by-side super-treating zones 21 co-extensive in length with the uniform field zone 20. The super-treating zones 21 are in open-ended passages formed by a grid of inter-spaced electrodes. This grid is shown as including an electrode set 22 consisting of electrically-connected parallel electrodes 23 having anterior or stream-splitting edges 24 nested between anterior portions of parallel electrodes 25 of another electrode set 26 having posterior edges 27 nested between posterior portions of the electrodes 23, the super-treating zones 21 being formed between the overlapping portions of the electrodes 23 and 25. The electrode sets 22 and 26 are connected across a high-voltage source of unidirectional potential, the field patterns established by such electrode energization being shown by dotted lines 21a in Fig. 1 which represent lines of force of the field.

It will be observed that at the entrance portion to each super-treating zone 21 the unidirectional electric fields are non-uniform, as suggested by dotted lines 29 which represent lines of force which are more concentrated at the edges 24, thereby forming a zone 30 of preliminary treatment. The non-uniform fields in this zone supplement or may sometimes substitute for the fields in the treating space 17, coalescing the more easily treated emulsion particles to sufficient size so that they can gravitationally separate from the emulsion stream before it enters the super-treating zones 21. The emulsion entering these super-treating zones should have no more than about 2% of dispersed-phase material and preferably not more than one-half of 1% or less of this material. If the emulsion jetted into the entrance zone 10 contains more than about 2% of the dispersed-phase material or an amount too high to give the desired results in the super-treating zones and if sufficient of this material does not gravitate from the advancing stream shortly after discharge into the entrance zone, the non-uniform unidirectional electric fields in the zone 30, supplemented if necessary by the alternating-current or direct-current non-uniform fields in the treating space 17, serve to reduce the dispersed-phase material to the low contents indicated above.

In the super-treating zones 21, the electric field is of substantially uniform gradient, as suggested by the parallel dotted lines 21a representing lines of force transverse to the direction of emulsion flow, the field being of substantially uniform gradient measured along such lines of force. Additionally, it is desirable that the super-treating zones 21 be bounded by electrode surfaces sufficiently smooth and sufficiently free of sharp edges throughout the length of the super-treating zones that no appreciable localized field concentrations are present in these zones at distances from the electrodes more than a small fraction of the electrode separation. It is essential to the super-treating action that the fields in the super-treating zones 21 should be uni-directional.

For commercial application and for structural purposes, it is often desirable to have the downstream or posterior portions of the electrodes 23 extend in a downstream direction beyond the posterior edges 27 of the electrodes 25, in which case non-uniform fields will be present beyond the exit ends of the super-treating zones 21. This, however, is of no consequence from a treating standpoint, being neither beneficial nor detrimental to the emulsion treatment, since by the time the emulsion passes through this region the super-treating action will already have taken place and the treated oil will have a negligible content of dispersed-phase material.

Considering the hydraulics of the treating system of Fig. 1, it will be apparent that the turbulently advancing large stream in the entrance zone 10 is split or pierced by the front or anterior stream-splitting edges 33 of the electrodes 25, advancing forwardly from this point through the zone 30 as double-width streams until again split or bisected by the front or stream-splitting edges 24 of the electrodes 23, the preliminarily treated emulsion advancing beyond this point as single-width streams or segments into and along the super-treating zones 21. It is important to the invention to employ an electrode configuration which will adequately smooth out the flow of the emulsion so that, at least in the greater downstream portion of each super-treating zone, the flow is substantially laminar or substantially non-turbulent, or to otherwise establish a flow-straightening action ahead of the entrance portions of the super-treating zones 21 for this purpose and to avoid substantial turbulence and cross-currents in the forward flow of the emulsion while in these downstream portions of the super-treating zones. In the equipment illustrated in Fig. 1, some degree of flow straightening is obtained by passage through the interring passages of the electrodes 18 and 19, but the anterior portions of the electrodes 23 and 25 form a further flow-straightening means and by proper design can be made to substantially eliminate turbulence so that the emulsion advances along at least the downstream portion of each super-treating zone in substantially laminar flow, such flow continuing through the super-treating zones and generally through a laminar-flow zone 35. Beyond this zone the separate streams join into a larger conduit-filling stream of treated oil advancing along an exit zone 36 from which the treated oil is withdrawn through a suitable outlet means. This outlet means may have a single orifice for withdrawing the treated oil but preferably is a collector 37 providing a plurality of orifices spaced from each other in a transverse zone of the exit zone 36, the treated oil entering at numerous points as suggested by the arrows 38. Such a manifold-type collector promotes substantially equal forward velocity in all of the super-treating zones 21 and avoids inducing cross-currents or non-uniform flow in these zones, being of particular value since it makes it possible to obtain uniform flow conditions in a most efficient manner.

In order to prevent the turbulent conditions existing in the entrance zone 10 from continuing in the super-treating zones of the process, the separation of the flow-straightening members should be relatively small, and the length of the path through the flow-straightening zone 40 should be relatively large compared with this separation. Preferably, the length of the flow-straightening zone should be at least twice and preferably four or more times the width of the super-treating zones 21, thus permitting the establishment of the smoothest flow possible in the major portion of each super-treating zone. For this and other reasons, it is desirable that the super-treating zones 21 should be narrow relative to their length, a ratio of at least 1:3 being desirable.

Fig. 2 illustrates the use of a flow-straightening means 41 to supplement the flow-straightening actions of the electrodes 18, 19 and of the electrodes 23, 25 in the zone 40. The flow-straightening means 41 may be a grid-like structure extending transverse to the forwardly flowing emulsion stream and providing open-ended passages 42 between members 43, these passages being narrow relative to their length, a ratio of at least 1:3 being desirable. This provides an auxiliary flow-straightening zone 44 and modifies some of the other zones of Fig. 1, the modified zones and the structural elements in Fig. 2 being indicated by primed numerals corresponding to those of Fig. 1. Thus, in Fig. 2 the zone of turbulent flow 15' is shorter than in Fig. 1 and the lower zone of preliminary treatment 16' is shown somewhat extended to take care of a situation where electric fields are established upstream of the rings 19' or downstream of the rings 18' as when such rings are at a potential above ground potential.

Fig. 3 illustrates the distribution of flow across a desirably narrow super-treating zone, the velocity being represented by forwardly pointing arrows. It will be seen that in this laminar flow, adjacent films or laminae of the emulsion have considerably different forward velocities. This is believed to be one of the contributing factors in the super-treating action. The differential velocity will be higher the closer the spacing of the electrodes, and it is preferred to use spacings that are relatively small for this and other reasons. High differential velocity between adjacent films of the forwardly advancing emulsion makes it possible for dispersed particles, which are too far apart to be coalesced by the imposed electric field, to approach each other more closely so that a rapid electrical coalescence is possible. This is at least in part an explanation for the effectiveness of the combination of electric field and hydraulic factors involved in the super-treating process.

In contrast, Fig. 4 represents the distribution of flow where the separation of the electrodes is much larger than in Fig. 3. Fig. 4 shows that for the same average forward emulsion velocity the differential motion between adjacent films is considerably less than in the case of smaller spacings.

The systemic changes which take place when an oil is treated with a reagent such as an acid or an alkali by the process of this invention can be described as follows, in terms of a petroleum distillate and a concentrated acid such as a 93% sulfuric acid. The acid is mixed intensely with the oil so as to produce a fine dispersion having the oil as the continuous phase and the acid in the form of minute droplets. In this manner efficient contact between the two phases is readily achieved. This emulsion is introduced into the zones of preliminary treatment 16, 16', 30 or 30', where it is subjected to an electric treating action which coalesces some of the dispersed acidic particles into masses which settle from the remaining emulsion, thus reducing the amount of dispersed phase to a degree sufficient that the direct-current super-treating fields 21 will not tend to be short-circuited when the remaining emulsion flows through them. In commercial treating operations, the rate of flow of the emulsion into the preliminary separating zones is sufficient to cause turbulence in those zones which, together with the non-uniform character of the electric field therein, prevents removal of the acid from the oil to the degree possible in the super-treating zones. The turbulence is removed from the stream by the flow-straightening zones 40, 40' or 44, and the remaining emulsion enters the uniform-field super-treating zones 21 or 21' wherein the final super-treating is effected and the dispersed-acid content of the oil reduced to very low values. The restricted flow patterns in the zones 21 or 21' insure a very smooth flow and maximum reduction of the dispersed-phase content of the emulsion.

The super-treating action is predominantly one involving coalescence of the widely-spaced dispersed particles into oil-dispersed masses of sufficient size to gravitate from the advancing stream. This is in contradistinction to any process in which the dispersed particles are of polarizable nature or carry fixed charges to move by electrophoretic action transverse to the advancing stream to deposit on and run down off one of the electrode surfaces. None of such processes have found commercial application because the electrophoretic mobilities are so low as to make such processes impractical. While the dispersed particles of many emulsions have measurable electrophoretic mobilities and thus may tend to migrate toward one of the electrodes, the present invention is not limited to treatment of such emulsions. The super-treating action herein involved is not one which relies upon an action in which particles are plated out on one of the electrodes. In fact, in commercial operation of the present process, the forward velocity of the emulsion is such as to give a treating or residence time in the super-treating zones 21 that is grossly insufficient to permit substantially all of the particles to move by electrophoresis transversely of the advancing stream to deposit on either electrode.

That my processes is predominantly one of coalescence of the particles in situ rather than a plating-out action on one or both of the electrodes has been proved by collecting samples of the coalesced material gravitating from the advancing stream at various transverse positions below the grid of inter-spaced electrodes. The average amount of coalesced material collected immediately below the electrodes 18 and 19 has been found to closely approximate the average amount collected below the mid-planes of the treating spaces 17.

On the other hand, the super-treating action is apparently facilitated if the dispersed particles of the emulsion have differing electrophoretic mobilities. In understanding this, it must be remembered that the dispersed particles present in the super-treating zones are minute and widely spaced. While the unidirectional electric field creates attractive forces between individual particles, these particles will not thereby be coalesced until they come relatively close together because the electric forces fall off rapidly with increase in the distance between the spaced particles. If two particles of different electrophoretic mobility are present, they will move transversely of the field at different velocities and the faster-moving particle will approach the slower-moving one, coming into such proximity that the electrostatic forces can then coalesce the particles. Such differential movement of two adjacent particles may also take place if the particles are respectively in adjacent laminae of the advancing emulsion stream, as illustrated in Figs. 3 and 4, thus facilitating coalescence of such particles.

If the general flow of the emulsion is vertically upward, the electrically coalesced masses produced in any of the zones 16, 20 or 30 or any coalesced masses produced by contact of particles in the entrance zone 10 will settle downwardly against the rising stream until they can be drawn off, usually as a continuous separate mass, by a draw-off device 46 communicating with a draw-off zone below the entrance zone 10. If the entire treating process takes place in a single tank, the separated phase may be maintained as a body of continuous liquid having an interface with the supernatant oil-continuous liquid in a zone suggested by the dotted line 47. If, on the other hand, the emulsion flows through the electric fields in a generally horizontal direction, the downward fall of the coalesced particles will be in a direction transverse to the emulsion flow, and the coalesced material will collect in a draw-off zone to one side of the passage along which the forwardly-advancing emulsion stream moves. However, there is considerable advantage in operating the process so that the emulsion flow is substantially vertical because the particles that are coalesced in the super-treating zones 21 then settle into the zones of preliminary treatment 30 and/or 16 where they are again increased in size by coalescence with each other and with the coarser particles already being treated in these zones so that more rapid sedimentation is possible. This is of substantial commercial importance since the throughput capacity of the treating equipment is thereby substantially increased.

The super-treating action of the present invention cannot be obtained by use of alternating-current fields applied to the same super-treating electrode system, contrary to any prior belief in the art that A. C. and D. C. fields are largely equivalent in treating crude oil emulsions. Nor is the super-treating action possible if the gradients measured at different positions along the midplane of each super-treating zone 21 are non-uniform in the sense of being locally concentrated because of the presence of points or edges on the electrodes giving a blast effect. The electrodes 23 and 25 are preferably smooth-surfaced elements with no surface irregularities within the super-treating zones that would establish non-uniform fields in a plane a small fraction of an inch from the electrode surface. Relatively high voltage gradients in the uniform fields of the super-treating zones are desirable. Depending upon the emulsions being treated, optimum results will be obtained with voltage gradients between about 4,000 volts per inch and 20,000 volts per inch or higher. It is preferable that the width of each of the super-treating zones 21 should be substantially the same and that the forward velocity in these zones should also be substantially the same when such widths or velocities are measured in a plane perpendicular to the direction of flow. In other words, the forward velocity in opposed portions of adjacent super-treating zones is desirably substantially the same even if the velocity should increase or decrease somewhat during flow from end to end of any particular super-treating zone, as when this zone is tapered slightly or is of a wedge or frusto-conical shape.

The polarity of the electrode set 22 of Fig. 1 may be either positive or negative with respect to the electrode set 26. I have found that in general there is little if any difference in commercial treating results obtained whether one or the other of such sets is made positive, for example, and this is especially true in the case of the acid treatment of an oil. However in some systems, especially those in which the oil is treated with an alkali, as in the removal of naphthenic acids from diesel oil, I have found that somewhat better results are obtained if the upstream electrode set 26 is made positive with respect to the downstream electrode set 22. This is especially true with the smaller electrode spacings when dealing with alkaline systems and involves the principle that concentrations of the electric field are then desirably avoided at the positive electrode in the region where the emulsion enters the uniform-field super-treating zone.

Some of the beneficial effects over and above those possible by conventional processes obtainable by treating an oil with a concentrated acid or an alkaline solution by means of the process of this invention are as follows:

In the case of an oil treated with concentrated sulfuric acid the advantages are: (1) High efficiency of contact is possible because more intense mixing of the acid with the oil can be tolerated. (2) The amount of acid carryover with the oil is extremely small and sometimes practically nil. (3) The rapid separation of the acid from the oil precludes the aging of the sludge, thereby preventing the re-solution of undesirable constituents in the treated oil. (4) The effective coalescence, especially of the fine particles of the emulsion, prevents the occlusion of oil in the sludge layer and thereby minimizes the oil loss of the process. (5) The very low carryover often avoids the necessity for a subsequent water-washing step ordinarily required before the oil is suitable for further processing. (6) The overhead oil is usually bright and free from haze and of high color quality. (7) The very low carryover also minimizes the amount of alkali necessary for neutralization of the acid stream when that is required and effects large savings in this regard. For example, a commercial acid treating process for refining 16,000 barrels per day of naphtha was converted to operate in accordance with the electric process of this invention, thereby effecting large savings resulting from the elimination of tower packings and maintenance of previously-used equipment. In addition, the extremely low amount of residual acid (less than .001%) left in the naphtha after passage through this electric equipment afforded a saving in the subsequent alkali-treating step amounting to about $10,000 per year in the cost of the caustic alone.

When the oil is treated with an alkaline solution considerations similar to those of the acid treatment apply, i. e., more intense emulsification is possible as compared with older commercial processes, thereby increasing the contact efficiency; the overhead carryover is very low; the super-treating of the fine alkaline particles avoids the formation of coarse emulsions which must otherwise be withdrawn with the separated alkaline phase, thereby causing oil losses; because of low carryover, the oil need not usually be water-washed and is often ready for further processing or direct sale; and a bright, haze-free overhead product is usually obtainable by this process.

Especially excellent quality of oil is obtainable if an oil which requires a sequential acid-alkali treatment is treated in both of these steps by the process of my invention. The acid treatment particularly conditions the oil for the subsequent treatment with alkali, relatively enormous savings in alkali costs are effected, and improved products are obtained.

In order to illustrate the manner in which the principles of electric treating described above may be applied to commercial operations, two embodiments are shown in Figs. 6-11 and are described below.

Fig. 6 shows a grounded conical-bottom container or conduit 50 completely insulated by a coating 51 to prevent localized differences in temperature such as would induce ring-type circulations through or linking with the super-treating zones or in the upper portion of the container. If the super-treating action is carried out at elevated temperatures, as is often desirable particularly when treating the heavier oils or distillates, its effectiveness is lessened by any localized cooling of the container or its contents, even by drafts or air currents, and this is prevented by the insulating coating 51. If the emulsion is to be heated, this should be done ahead of the treater, and any localized heating within the container 50 should be avoided.

A preliminary treating space 54 is defined between a live electrode 55 and a grounded electrode 56, these electrodes being made up of spaced concentric metallic rings mounted on suitable supports. The electrode 55 is suspended on a rod 57 hung from an insulator 58, this electrode being energized through a conductor 59 extending through a bushing 60 to a high-voltage source of alternating-current or direct-current potential, the former being suggested by the high-voltage transformer 60a. In this embodiment, the emulsion is discharged directly into the electric field established in the treating space 54 by a distributor 61, shown open but of the spring-closed type, which discharges a sheet of the emulsion radially as suggested by the arrows 62. Short-circuiting is prevented both by the high turbulence and velocity and by the edge-bounded fields which are highly concentrated at the edges of the electrodes 55 and 56. Portions of the emulsion rise between the rings of the electrode 55 as suggested by arrows 63 while other portions of the emulsion rise around the outer periphery as suggested by the arrows 64, thus tending to distribute the emulsion across the cross section of an entrance zone 65 to create a conduit-filling stream rising toward a lower grid of inter-spaced electrodes 66. Alternatively, the distribution system may be one or more perforated pipes placed in a transverse zone below the electrode 56, as suggested in Fig. 1.

The grid of electrodes 66 includes a plurality of concentric cylinders 67 secured to arms forming a support 68, the intervening spaces being bisected by concentric cylinders 69 depending from a support 70. The inter-spaced electrodes define a series of super-treating zones 71 as previously outlined but here of increasing cross-sectional area toward the container, although all of equal width including the outermost super-treating zone formed between the container wall and the outermost electrode 69. The support 70 is mounted on a metal tubular member 72 connected to a support 73 of an upper grid of inter-spaced electrodes 75 identical with the lower grid 66. The support 73 is hung by rods 76 from three insulators 77, two of which are shown. One of the rods 76 is connected to a conductor 78 which extends through a bushing 79 to a high-voltage source of unidirectional potential 80 such as a half-wave or full-wave rectifier whether or not equipped with capacitors or inductances to smooth the pulses of the rectified current. This source of unidirectional potential energizes the upper electrode set of the grid of inter-spaced electrodes 75. The high-voltage current is conducted through the tubular member 72 to the upper electrode set of the lower grid of inter-spaced electrodes 66 to energize same.

The emulsion is preliminarily treated in the treating space 54 to remove some of the dispersed-phase material. The rising conduit-filling stream is split by the electrodes of the grid 66 and is subjected to a further preliminary treating action near the entrance ends of the super-treating zones 71 and to a super-treating action in such zones, as previously described. If an additional super-treating action is desired, the upper grid of inter-spaced electrodes 75 can be employed so that the emulsion is passed again through super-treating zones before reaching an exit zone 82 from which it is withdrawn through a collector 83 shown as a plurality of closed-ended pipes radiating from a manifold 84 connected to a pipe 85 through which the treated oil flows. The pipes of the collector provide orifices preferably spaced or sized to intake more of the treated oil toward the tank, e. g., the intake at any radial position may be substantially in proportion to the square of the radius to insure columnar flow in the container 50. The emulsion is preferably distributed in the entrance zone 65 and the treated oil withdrawn from the exit zone 82 in such way that the volume of each smaller stream advancing along a super-treating zone is in substantially the same proportion to the volume of the larger stream in the zones 65 or 82 as its cross-sectional area is to the total cross-sectional area of all the super-treating zones of the particular grid of inter-spaced electrodes.

It will be observed that all portions of the rising column of emulsion are subjected to super-treating fields of substantially uniform voltage gradient with the exception of a negligibly small central stream rising through the space between the rod 57 and the tubular member 72. If the electrode 55 is eliminated or otherwise energized, the tubular member 72 can be blocked off to prevent this small flow, although with the arrangement shown the small stream of emulsion can be subjected to a unidirectional electric field between the rod 57 and the tubular member 72 if the transformers of a D. C. and an A. C. source are energized from the same line, albeit not a field of substantially uniform voltage gradient if the rod 57 is small. Alternatively, if the electrode 56 is energized by a D. C. source, the electric field between the rod 57 and the tubular member 72 can be made zero or small by having these elements of the same polarity, or can be made a double-voltage field if the elements are of opposite polarity.

In many instances, the lower grid of interspaced electrodes 66 can be eliminated. In other instances, this grid need not be energized, in which event it acts to some extent as a flow-straightening means for the upper grid 75. If the emulsion to be treated has a sufficiently low content of dispersed-phase material, the electrodes 55 and 56 can be eliminated or de-energized. However, with the arrangement shown, the dispersed material coalesced in any of the electric fields will drop to and through the field therebelow to aid the coalescing action therein. This is particularly desirable if the particles are merely agglomerated in an upper field because another field therebelow containing larger coalesced masses will usually cause the agglomerated masses to join with such larger masses and form single-phase larger masses which settle to form a body of liquid of the dispersed-phase material as distinct from a layer of incompletely resolved emulsion or sludge.

Use of the electrodes 55 and 56 is very desirable if the content of dispersed-phase material is initially such as would cause short-circuiting of the super-treating fields. The electrodes 55 and 56 establish a non-short-circuiting field because of the jet action, turbulence and non-uniform gradient therein so that these electrodes condition the emulsion for satisfactory treatment in the super-treating zone 71. The coalesced material from all of the fields collects in the conical bottom of the container 50 and is removed continuously or intermittently through a pipe 86.

In treating acid or alkali emulsions, it is very desirable that the insulators 58 and 77 and the lower portions of the bushings 60 and 79 should be protected from contact with the treated oil, since even the small amounts of dispersed acid or alkali carried over can eventually coat the insulating surfaces to the extent that they become conducting and render the electric system inoperative. This is preferably accomplished by placing each of these members in a separate open-bottom tubular member or shield 90 to form a pocket around such member. Pipes 91 communicate respectively with each of the pockets, and it is desirable to introduce into each such pipe a protective fluid to circulate through the pocket and discharge slowly from the open lower end thereof. This may be accomplished by manifolding the pipes 91, as shown, and by supplying the protective fluid to the manifold under pressure slightly higher than the treater pressure. The preferred fluid is an oil substantially free of suspended material, preferably an oil having a specific gravity less than, but in any event no greater than, the treated oil in the top of the container 50. The circulated material may be an oil of the same type as the continuous-phase of the emulsion being treated but should be free of suspended material and should preferably be of a specific gravity somewhat less than that of the treated oil.

Fig. 6 illustrates diagrammatically several types of mixing devices that can be selectively used to form the acid-oil or alkali-oil emulsions. These are shown in respectively valved branch pipes connected to an oil pipe 100 along which the heated or unheated oil to be chemically refined is forced by an oil pump 101. The reagent is pressured by a pump 102 to flow along a pipe 103 in proper proportion to the oil flow. Valved branch pipes lead from the pipe 103 to the respective mixing devices. The outlets of the mixing devices feed into a relatively short pipe 105 which discharges the emulsion from the mixing device being used into the electric treater, as by supplying this emulsion to the distributor 61.

The type of mixing device shown uppermost in Fig. 6 is particularly well suited to the forming of alkali emulsions but can be used to inject acid into the oil ahead of some other mixing device. It comprises an outer pipe 108 which discharges into the pipe 105. An inner pipe 110 is closed at its inner end by a movable head 111 mounted on a rod 112 which is strongly biased leftward at a position beyond the outer end of the pipe 110, as by a spring 113 adjustable by its engaging nut 114 threaded to the rod 112. The pipe 103 delivers reagent to the outer end of the inner pipe 110 to flow around the rod 112 and jet as a high-velocity outwardly-directed sheet through an annular orifice between the head 111 and its seat at the end of the inner pipe 110. The reagent thus jets laterally into an annular stream of the oil flowing turbulently through the annular space between the pipes 108 and 110 and is broken into fine droplets by the jet action and the shearing action of the passing oil.

As an alternative, the oil and reagent may be thus or otherwise pumped together at the inflow side of a centrifugal pump 116 producing a pressure either in the same direction as the pump 101 or, as shown, opposing but less than the pressure of the pump 101. Such a reverse-connected pump produces an intense mixing action particularly well suited to forming acid emulsions.

As further alternatives, Fig. 6 shows a mixing valve 120 in one branch line, the degree of mixing being controlled by the pressure drop thereacross, and an orifice-plate mixer 121 in another branch line. The latter provides a plurality of orifice plates 122 mounted in the branch pipe, often with successively smaller orifices in a downstream direction. Alkali-oil emulsions satisfactory in the process can be made by the valve 120 or the orifice-plate mixer or the injector-type device or even by flowing streams of the oil and alkaline solution together at a pipe junction.

The treater shown in Figs. 7-9 embodies similar principles although in simplified form and is later exemplified with particular reference to a process for removing naphthenic acids from a petroleum distillate such as diesel fuel. Here the oil moves through a heater or cooler 125 to a pump 126 which discharges into a pipe 127 leading to a mixer 128 which may be of any of the appropriate types previously described. Two pipes 130 and 131 with respective pumps 132 and 133 can be used separately or together to deliver the reagent to the oil stream. The emulsion is delivered to an electric treater 140.

The treater includes a grounded tank or conduit 150 capable of withstanding pressures in the neighborhood of 50 p. s. i. or more and completely surrounded by a layer of insulating material 151. The emulsion to be treated is delivered under pressure to a pipe 152 having its far end closed by a plug 153, the emulsion flowing through a riser pipe 154 to a distributor means 155 comprising a manifold 156 with a number of end-capped pipes 157 radiating therefrom. The upper or lower surface of each pipe is perforated to provide openings 158 of substantial size and number which are preferably closer together toward the closed end of the pipe, representing a distributor means that may be used in any of the embodiments of the invention. The number of pipes 157 and the spacing of the openings 158 are preferably such that the volume of emulsion discharged at any radial position is substantially proportional to the square of the radius so as to produce a slowly rising mass or column of emulsion in an entrance zone 159, this rising column occupying substantially the entire horizontal cross-sectional area of the conduit above the position of discharge and moving slowly upwardly with substantially equal velocity at all radial positions. As before, the interfacial zone indicated by the dotted line 159a corresponding to the line 47 of Fig. 1 is preferably below the distributor means 155.

The electrode assembly is a grid of interspaced electrodes functioning to establish super-treating unidirectional electric fields, the electrodes being of substantial area in the direction of emulsion flow. The electrode assembly includes a lower electrode 160 comprising a plurality of concentric cylinders 161 welded or otherwise secured to arms 162 comprising a foraminous framework resting on brackets 163 and thereby connected to the tank or conduit 150. This framework permits free vertical flow of the emulsion into the field zones. The innermost cylindrical electrode 161 in this embodiment is closed by a plug 164. An upper electrode structure 165 includes a similar electrode support composed of arms 166 radiating from a central member 167 and carrying depending cylindrical electrodes 168 bisecting the annular spaces between the electrodes 161 to provide super-treating zones 170 on opposite sides of each electrode 161 or 168, except that the outermost electrode 168 is spaced from the tank or conduit to provide a super-treating zone 170a of a width substantially equal to each of the zones 170 and except that there is no treating space within the innermost electrode 161 closed by the plug 164.

The upper electrode structure 165 is supported from three equidistant rods 172, two being shown in the section of Fig. 7, these rods hanging from insulators 173 each supported by a spider 174. Each insulator 173 is surrounded by a depending sleeve 175, and a dielectric fluid, such as an inert gas or a fluid of the type heretofore disclosed, is supplied to the interior thereof through a small valved pipe 176. The dielectric fluid is preferably continuously supplied in very small volume, or a body thereof can be entrapped in the sleeve 175 to prevent rise of the treated oil into contact with the insulator. The dielectric fluid can be withdrawn at intervals through a pipe 177 preparatory to replacement through the valved pipe 176. If a gas is employed, it may be any inert gas not tending to form an explosive mixture with the vapors from the oil, such as natural gas, nitrogen, or carbon dioxide.

A high-voltage, unidirectional potential is applied to the upper electrode structure 165 by a lead 178 insulated from the conduit by a bushing 179 and also protected by a sleeve 180 to which the dielectric fluid may be supplied through a small pipe 181. Any suitable source of high-voltage, unidirectional current can be employed, and this is indicated diagrammatically on the drawing by the box 182, usually comprising the full-wave rectification of a high-voltage alternating current. Either positive or negative polarity may be made available at the high tension lead 183, the other pole of the power pack being grounded.

When connected to the treater, the capacitance of the electrode structures tends to filter any pulsating currents supplied by the power pack, but the amount of such filtering will depend upon the capacity of the electrode structure under the condition of operation with the oil system employed. If less ripple or a constant-potential wave form is desired, additional filter elements can be imposed in this or other energizing circuits. For example, a condenser 184 can be placed in the circuit in parallel with the electrodes by closing a switch 185.

The treated oil and the separated dispersed-phase material are respectively withdrawn from the treater through draw-off pipes 186 and 187 at such rates as to maintain the interfacial level in the conduit 150 near the line 159a. The withdrawal rates may be regulated by valves in the pipes 186 and 187 to maintain a back pressure on the treater. Any suitable level control device known in the art can be used to control automatically the rate of withdrawal of the dispersed-phase material. In Fig. 7 the pipe 186 serves as a collector, withdrawing the treated oil at one central position—an embodiment that can sometimes be used when the electrodes are spaced substantially below the top of the container, but which embodiment is less desirable than the manifold-type collectors of the previously-described embodiments.

As shown in the enlarged fragmentary view of Fig. 9 and in the further enlarged showing of Fig. 10, the lowermost stream-piercing edges of the electrodes 168 may, if desired, be rounded to reduce field concentrations thereadjacent, the rounded edge being indicated by the numeral 202, either a rounded or substantially flat edge giving rise to the field pattern discussed with relation to Fig. 1 and there indicated by dotted lines 29. The upper ends of the electrodes 161 may be similarly rounded, if desired. As in Fig. 1, there will be a zone of preliminary treatment 203 between the electrodes 161 below each edge 202 which can be used to reduce the content of the dispersed-phase material in the emulsion. If the intensity of the relatively concentrated field in the zones 203 is to be reduced or if the electrodes 168 are to be reinforced, the lower edges of the electrodes 168 may be rolled to provide a rolled surface 204 shown in Fig. 11. Similar rolled edges may be provided at the upper ends of the electrodes 161. Such rolled surfaces will present larger areas at the electrode edge, leading to less concentration of the field thereadjacent.

In the embodiment of Figs. 7-9, the depending portions of the electrodes 161 serve as the initial flow-straightening means and circulatory currents are further damped out by the flow-straightening action of the lower ends of the electrodes 168, leading to a condition of tranquil or substantially laminar flow in the super-treating zones 170. As before, the overlap of the electrodes 161 and 168 should be sufficient that each super-treating zone 170 should be of a longitudinal length several times its width so that the desired super-treating action will be obtained.

As a general example of the invention, one may consider the problem of removing naphthenic acids from a distillate such as diesel fuel, using the equipment of Fig. 7 and producing a clear distillate of superior quality and an improved soap stock which by acidulation or other processing yields naphthenic acids of high quality. Previous batch or semi-continuous processes are plagued with emulsion difficulties, the distillate containing emulsifying agents among which are the naphthenic acid soaps. Attempts have been made to avoid formation of emulsions by using less intense mixing, but this has been at the expense of adequate reaction between the alkali and the acids of the oil. In prior processes, the separated distillate often contained dissolved or dispersed soaps in amounts of 25 p. t. b. or more, as compared with the present process in which the amount of residual soap is usually not more than a few pounds per thousand barrels, the soaps being calculated as NaOH. The separated distillate from prior processes often left from several tenths to one percent of suspended aqueous material in the separated distillate which produced a turbidity or cloudiness detrimental to the usefulness and marketability of the product. The residual suspended material in the treated distillates of the present invention is so low that it has been necessary to develop entirely new test equipment to measure it, the products being clear and brilliant. It is not uncommon for the present invention to produce treated light distillates having .001% or less of suspended material.

In treating such distillates, I prefer to use a strong alkali, typically the hydroxides of alkali metals and of quaternary ammonium compounds, added to the oil in aqueous solution. If the solution is too dilute, there is a tendency to form inverse-phase emulsions which interfere with electric resolution and produce inverse-phase sludges in the interfacial zone of the treater. If the alkali solution is too concentrated, there is a tendency to salt out the soaps. At intermediate concentrations of about .2 N to 2.0 N, and usually between .5 N and 1.0 N, excellent results are obtainable. Within such ranges, I prefer to select the concentration giving the least formation of inverse-phase emulsion or sludges. If more convenient or desirable to inject stronger alkaline solutions into the oil stream, the adverse effects usually attendant upon use of such stronger solutions can be mitigated by adding the stronger alkali through one of the pipes 130, 131 and by subsequently or previously injecting into the oil through the other of the pipes 130, 131 such amount of fresh water as would, if added directly to the strong alkali solution, reduce its concentration to a value within the above ranges. The separately added water mixes to some extent with the stronger alkali droplets in the oil stream, and such separate addition of alkali and water falls within the scope of the herein-defined step of adding an aqueous alkaline solution within the above ranges.

The amount of alkali employed in the removal of naphthenic acids will depend upon the amount of these acids to be removed. Employment of a given amount of alkali will react about 95% of the stoichiometrically equivalent amount of the acids so that one desirably uses an amount of alkali slightly in excess of the amount of naphthenic acids to be removed. However, it is desirable in a naphthenic acid process that the amount of alkali be not appreciably in excess of that substantially equivalent to the total naphthenic acid content of the oil, thus avoiding reaction with phenols, if present, to such extent as to produce unduly large amounts of phenolic material in the soap stock.

In the alkali treatment of distillates such as diesel fuel, very little mixing action is needed to form the fine-particle emulsions of the invention. Sometimes it is sufficient to bring the streams of distillate and alkaline solution together at a pipe junction, the turbulence at the junction chamber together with turbulent flow in the piping leading to the treater effecting the mixing, or to inject the alkaline solution into the distillate stream in an upstream, downstream or transverse direction with respect to the direction of flow of the distillate. In other instances, further mixing can be effected by the appropriate mixing devices previously described. With a distillate such as diesel oil, for example, the desirable intimacy of mixing is such as to produce an emulsion which, if centrifuged for two minutes at 1,000 times gravitational force, will produce a supernatant oil which is still turbid or cloudy when viewed in a 100 ml. centrifuge tube and which supernatant oil will form a definite Tyndall cone. The particles of soap stock in such an emulsion are extremely small, being of the order of magnitude of 1 to 10 microns in diameter. When introduced into the treater, some of the aqueous particles of the emulsion may settle, producing an emulsion of reduced content of dispersed-phase material well suited to the super-treating action described above.

Some distillates are desirably heated before being treated but many, including diesel oil, will treat very satisfactorily at ordinary temperatures, e. g., 70–80° F., or slightly higher. Average distillate treating temperatures are about 110–120° F. but sometimes are considerably higher when treating heavier distillates, but in the alkali treating process it is desirable to treat at as low a temperature as practical because high temperatures increase the solubility of the soaps in the distillate.

The treated distillate effluent from the treater will usually be clear or will become so during a storage for a matter of a few hours. This differs from conventionall processes which often produce cloudy products and from which additional separation of aqueous material is so extremely slow or non-existent as usually to require supplementary treatment to produce a clear product. The soap stock separating in the process is generally a clear brown liquid free of dispersed oil, as distinct from the murky and turbid soap solutions often obtained from conventional processes. The concentrations of soap produced by the present process are in a desirable range for reaction with acid to liberate naphthenic acids having generally high acid numbers and containing comparatively small amounts of non-acidic materials. Generally, the soap stock is free of unreacted alkali, indicating that the alkali has been used to the fullest extent, but if unreacted alkali is present, it will usually not exceed 5–10% of the total alkalinity.

With a 10 ft.-diameter treater of the type shown in Figs. 7–9 with electrodes spaced 3½ in. and energized by a direct-current potential of 25,000 volts, a diesel fuel of approximately 32° A. P. I. and containing 104 p. t. b. of naphthenic acids was emulsified at a rate of 119 barrels per hour with .75 N caustic flowing at a rate of about 45 gallons per hour. The upward velocity in the super-treating zones was approximately 8.5 ft. per hour and during a 24-hour operation the effluent distillate averaged .005% in residual dispersed material and the acid removal averaged 91%. The soap content of treated distillate was less than 1.7 p. t. b.; no sludge formation of any kind was discernible; and the soap stock was clear and contained no free alkali. Another diesel fuel containing 109 p. t. b. naphthenic acids was emulsified with .44 N alkali and treated at a gradient of 5 kv./in., producing a treated oil containing .0003% residual dispersed material. Here some oil-in-water sludge was formed but disappeared when a 2 N solution was used along with a later-added amount of water that brought the total aqueous content of the emulsion to the same value as before, the treated oil then showing no measurable water content.

In the alkali treatment of oils, if it is required to neutralize substantially all of the acids present, it is desirable, as mentioned above, to use an amount of alkali which is not appreciably in excess of that amount substantially equivalent to the strong acid content of the oil. If, as in the present process, all of the alkali is effectively utilized because of the permissible intimate contact between the alkali and the oil, and oil-phase determination of the pH of the resulting emulsion before it enters the electric treater will desirably show a pH between about 10.5 and about 11.0. Such oil-phase determination of pH of the emulsion can be made in accordance with the teaching of the patent to Suthard No. 2,607,718, such determination involving, in general, removing a sample stream of the emulsion, converting this heterogeneous or dual-phase system into a homogeneous or single-phase system by adding a suitable mutual solvent such as secondary butyl alcohol in sufficient amount to effect this conversion, the resulting single-phase solution being sent to an electrometric cell equipped with a glass electrode and a reference electrode. The potential developed between these electrodes can be amplified to produce an indicated pH value. The electrometric cell and the associated indicating equipment may be a conventional pH meter, the indicated pH values being within the range suggested above. Under the above circumstances, and with efficient utilization of alkali, and oil-phase determination of the pH of the treated oil will give practically the same value as that of the oil-phase pH of the emulsion. Indeed, it is the possibility of obtaining virtually complete reaction between the alkaline solution and the acidic constituents of the oil by the use of my process that makes the pH determination of the emulsion a satisfactory criterion for controlling the addition of the proper amount of the alkali to the oil.

The following are additional examples of the operation of the invention.

*Example 1*

A series of tests was made by the process of this invention utilizing an electric treating system of the general type depicted in Fig. 7. The vessel used was 30" in diameter and the electrodes were concentric cylinders 24" long. Mid-Continent distillate was mixed with 1% by volume of concentrated (93%) sulfuric acid and the mixture thoroughly emulsified by passage through an emulsifying valve. The amount of sludge carried overhead was measured and the test repeated with electrodes having different horizontal spacings. The result of this series of tests is shown in the curve "A" of Fig. 5. In this figure, the abscissa represents the spacing between adjacent electrode surfaces and the ordinate the percentage of dispersed-phase material after passage of the emulsion through a treating system of the type of Fig. 7. At the smaller spacings extremely effective removal of the dispersed acid sludge is accomplished by use of the electric field configurations and controlled flow through these fields in accordance with the invention. However, as the spacings are increased, the residual sludge carried over becomes greater until at about six inches no further appreciable changes occur. As a matter of fact, the superior effectiveness of treating with direct current is largely lost when operating in the larger electrode spacing range, where alternating current gives approximately the same treating results.

When tests were made with voltage gradients varying from 4 to 10 kv./in. and the results plotted in terms of the variables of Fig. 5, the curves obtained had the same general shape as the curves A and B, except that they were vertically displaced from each other.

*Example 2*

A similar series of experiments as those given in Example 1 was performed on a distillate of the same type but treated with an alkaline solution instead of acid. In this case, the alkaline solution had a concentration of approximately 0.3 N and was used at a volume ratio of about 1% of the oil volume. The results of the operations are shown in curve "B" of Fig. 5, and exhibit the same general characteristics as those in curve A. This indicates that proper electrode spacing is of considerable importance in obtaining the super-treating results of my process.

*Example 3*

A Mid-Continent distillate was emulsified with 1% by volume of concentrated (93%) sulfuric acid and subjected to the process of this invention. The resulting overhead oil was found to have a residual acid-sludge content of .004% by volume. With the conditions of operation maintained substantially constant, an oil from the same source was similarly treated with acid but in this case the voltage applied to the super-treating field was of the A. C. variety. The residual carryover was found to be .017%.

*Example 4*

A Mid-Continent distillate was mixed with 1 volume percent of an alkaline solution that was 0.3 N in sodium hydroxide. The mixture was thoroughly emulsified and then subjected to an electric treatment by the process of this invention, utilizing a treating system of the type depicted in Fig. 7. At a voltage gradient of 6 kv./in., the overhead carryover was found to be .004%. When no voltage was applied to the electrodes, the overhead carryover rose to .85%.

*Example 5*

A Mid-Continent distillate was mixed with concentrated (93%) sulfuric acid and the mixture thoroughly emulsified by passage through an emulsifying valve. After subjecting this emulsion to the process of this invention, the treated oil was neutralized by contacting it with an alkaline solution. After several weeks' storage, the treated oil was found to have a color of plus 11 on the Saybolt scale. The color of the untreated sample after the same storage period was plus 14.

When an oil from the same source was mixed with acid and treated in the same way as a previous sample except that A. C. was applied to the electrodes, the treated sample color after aging for several weeks was found to be minus 13, whereas the untreated sample after aging for the same length of time had a color of plus 17.

*Example 6*

A Mid-Continent distillate was mixed with 1% by volume of an alkaline solution 0.3 N in sodium hydroxide. The mixture was thoroughly emulsified and subjected to the process of this invention by passage through an electric treating system similar to that depicted in Fig. 7. Good treatment was obtained until the flow rate was increased to about 2,000 barrels per day at which rate the electric system bogged down due to excessive current drain. When the volume percent of alkaline solution was preliminarily reduced to 0.1% before entering the electric field, good operation was again obtained, with an overhead carryover of .015%.

*Example 7*

A Mid-Continent distillate was mixed with 1% by volume of concentrated (93%) sulfuric acid and the mixture thoroughly emulsified. The emulsion then passed through an electric treating system somewhat similar to that depicted in Fig. 7 except that the concentric cylinder electrodes were made very short, the vertical length of the uniform-field super-treating zones being only three inches and there being a four-inch spacing between the electrodes. With D. C. applied to the electrodes, the overhead carryover was .056% and when A. C. was applied the carryover was also .056%. This is to be compared with a value of .012% obtained with electrodes having the same four-inch spacing but in which the length of each super treating zone was about 20".

*Example 8*

A Texas lubricating oil distillate containing 117 pounds of naphthenic acids (expressed as sodium hydroxide) per thousand barrels of oil was emulsified with an aqueous caustic soda solution, the amount of alkali being equivalent to the naphthenic acid content of the distillate and the solution-distillate ratio being about 1/20 by volume. The resulting emulsion was continuously treated at 180° F. by the process of this invention and at a voltage gradient in the uniform-field section of 4 kv./in. The acidity of the effluent distillate was found to be 8.4 p. t. b. (expressed as NaOH) corresponding to an acid removal of 93%, and this effluent was clear and showed no soap content.

This application is a continuation-in-part of my application Serial No. 92,698, filed May 11, 1949, which in turn is a continuation of my application Serial No. 526,306, filed March 13, 1944, both entitled "Treatment of Mineral Oil Products," and both now abandoned.

Based on the teachings of the present application, various changes and modifications will be apparent to those skilled in the art and can be made without departing from the spirit of the invention. Likewise, the individual features of the various treaters may be incorporated in other of the illustrated or suggested embodiments without departing from the spirit of the invention.

I claim as my invention:

1. A quick continuous process for the chemical refining of petroleum oils, which process includes the steps of: continuously dispersing into the oil minute droplets of a chemical reagent to produce an oil-continuous emulsion containing minute particles of dispersed-phase material resulting from the action of the reagent on a constituent of the oil, said chemical reagent being selected from the class consisting of acids and alkalis; promptly and continuously delivering said emulsion to an entrance zone of a passage in a manner to form a large stream advancing forwardly and turbulently along said passage; straightening the flow of said forwardly-advancing stream to substantially eliminate components of motion transverse to such flow and advancing the flow-strengtened emulsion into a plurality of side-by-side open-ended super-treating zones defined by interspaced electrodes in said passage, each super-treating zone being of an interelectrode width no more than about 6 inches and of a length at least three times its width; advancing the emulsion as small streams in substantially laminar flow forwardly through said super-treating zones while avoiding any recirculation of the emulsion while said emulsion is passing through said super-treating zones; subjecting the forwardly advancing small streams to the action of unidirectional high-voltage electric fields in said super-treating zones having lines of force transverse to the direction of forward flow of said small streams and of substantially uniform voltage gradient sufficient to coalesce said minute particles into oil-dispersed masses, the rate of flow along each super-treating zone being such that the emulsion of the corresponding smaller stream remains in its super-treating zone for a time substantially less than would be required for substantially all of its minute particles to move by electrophoresis transversely of the emulsion flow to deposit on either electrode; separating some of the dispersed-phase material from said emulsion in said entrance zone before entry into said super-treating zones, the emulsion containing no more than 2% of dispersed-phase material at the time of entry into said super-treating zones, said unidirectional electric fields coalescing particles of dispersed-phase material and producing said oil-dispersed masses; and separating said oil-dispersed masses from the oil.

2. A process for the acid treatment of hydrocarbon oils, which process includes the steps of: intimately mixing together streams of said hydrocarbon oil and a concentrated strong mineral acid to disperse the concentrated acid in the oil as small droplets which combine with components of the oil and produce an oil-continuous emulsion in which the dispersed-phase comprises minute particles of acid sludge; continuously discharging such emulsion at a plurality of transversely spaced positions into an entrance zone of a treating passage having a longitudinal axis in a manner to establish a large stream advancing turbulently along said passage in a forward direction substantially parallel to said longitudinal axis, some of the sludge gravitationally separating from said stream in said entrance zone; straightening the flow of such large stream to substantially eliminate components of motion transverse to said longitudinal axis; flowing the flow-straightened stream into side-by-side open-ended super-treating zones formed by interspaced parallel electrodes and compositely substantially completely filling a cross-sectional zone of said treating passage, each super-treating zone being of an interelectrode width no more than about 6 inches and of a length at least three times its width; advancing the emulsion as small streams in substantially laminar flow through said super-treating zones while avoiding any recirculation of said emulsion while said emulsion is passing through said super-treating zones; subjecting said small streams in said super-treating zones to the action of unidirectional high-voltage electric fields of substantially uniform voltage gradient having lines of force transverse to said small streams, said unidirectional electric fields coalescing dispersed sludge particles into oil-dispersed sludge masses of sufficient size to gravitate from the oil of the emulsion; joining said small streams into a larger stream advancing in said forward direction along said passage beyond said cross-sectional zone, said larger stream comprising treated oil; withdrawing treated oil from such larger stream thereof; collecting in a draw-off zone the sludge gravitationally separating from the oil while in said passage; and withdrawing the collected sludge from said draw-off zone.

3. A process for the acid treatment of petroleum distillates, which process includes the steps of: bringing together and very intimately mixing a stream of the distillate to be treated and a stream of concentrated sulfuric acid to produce a resulting emulsion in which the distillate is the continuous phase and minute particles of acid sludge constitute the dispersed phase; promptly and continuously delivering said emulsion to an entrance zone of a treating passage at a plurality of positions therein to establish a forwardly-advancing stream moving turbulently along said entrance zone; dividing said forwardly-advancing stream into a plurality of smaller streams and forwardly flowing such smaller streams respectively and substantially non-turbulently through super-treating zones defined by a plurality of electrodes spaced apart in said passage, each super-treating zone being of an interelectrode width no more than about 6 inches and of a length greater than three times its width; subjecting said smaller streams to the action of unidirectional high-voltage electric fields of substantially uniform voltage gradient in said super-treating zones with lines of force transverse to the direction of flow of such smaller streams; controlling the rate of introduction of the emulsion into said entrance zone so that each smaller stream flows forwardly along its super-treating zone in substantially laminar flow and remains therein for a time substantially less than would be required for substantially all of the sludge particles in such smaller stream to move by electrophoresis transversely of the advancing smaller stream to deposit on either electrode, each unidirectional electric field coalescing dispersed sludge particles in the emulsion therein; and gravitationally separating said coalesced sludge from the distillate.

4. A process for the sequential acid and alkali treatment of hydrocarbon oils, which process includes the steps of: continuously mixing with the oil a concentrated strong acid to produce a first acid emulsion comprising a continuous phase of oil with minute particles of acid sludge as the dispersed phase; promptly electrically treating said acid emulsion to coalesce sludge particles into coalesced sludge masses; separating said sludge masses to produce an acid-treated oil containing only a small amount of residual acidic components; continuously mixing with a stream of said acid-treated oil an aqueous solution of a strong alkali in sufficient amount to react with said residual acidic components and produce a second emulsion comprising a continuous phase of oil with minute particles of aqueous reaction products as the dispersed phase; promptly electrically treating said second emulsion to coalesce particles of aqueous reaction products into coalesced masses; and separating such coalesced masses of reaction products, each electric treating step comprising discharging the emulsion into an entrance zone of a passage to establish a large stream of such emulsion moving turbulently along said passage, straightening the flow of such turbulent stream and subdividing it into segments, advancing these segments respectively forwardly as smaller streams in substantially laminar flow along side-by-side open-ended super-treating zones defined by a plurality of electrodes spaced apart in said passage, each super-treating zone being of a width not more than about 6 inches and of a length at least about three times its width, and establishing high-voltage unidirectional electric fields of substantially uniform voltage gradient in said super-treating zones with lines of force transverse to said smaller streams therein, said fields coalescing the dispersed particles of the emulsion received thereby, such received emulsion containing no more than about 2% of dispersed-phase material.

5. A process as defined in claim 1 in which said chemical reagent is a solution of a strong alkali.

6. A process as defined in claim 1 in which said chemical reagent is a weak solution of a strong alkali mixed with the oil in amount sufficient to substantially completely neutralize the acidity of the oil.

7. A process as defined in claim 5 in which said solution of a strong alkali has a strength of about .2 N to about 2.0 N.

8. A process as defined in claim 5 in which the amount of alkali in said solution is sufficient to form an emulsion having an oil-phase pH within the range of about pH 10.5 to about pH 11.0.

9. A process as defined in claim 5 for removing from the oil naphthenic acids contained therein, said solution being a solution of a strong alkali of a strength of about .2 N to 2.0 N, the amount of alkali being slightly in excess of the amount equivalent to the naphthenic acids to be removed but not substantially in excess of that amount equivalent to the total amount of naphthenic acids in the oil.

10. A process as defined in claim 5 including the step of flowing said emulsion through a high-voltage coalescing electric field of nonuniform voltage gradient before entry into said super-treating zones to preliminarily treat said emulsion and produce said emulsion containing no more than 2% of dispersed phase material entering said super-treating zones.

References Cited in the file of this patent
UNITED STATES PATENTS

| | | |
|---|---|---|
| 987,115 | Cottrell | Mar. 21, 1911 |
| 1,405,124 | Harris | Jan. 31, 1922 |
| 1,931,725 | Girvin | Oct. 24, 1933 |
| 2,092,491 | Adams | Sept. 7, 1937 |
| 2,105,614 | Roberts | Jan. 18, 1938 |
| 2,182,145 | Eddy | Dec. 5, 1939 |
| 2,447,529 | Perkins | Aug. 24, 1948 |
| 2,447,530 | Perkins | Aug. 24, 1948 |

UNITED STATES PATENT OFFICE
CERTIFICATE OF CORRECTION

Patent No. 2,855,357                                    October 7, 1958

Richard W. Stenzel

It is hereby certified that error appears in the printed specification of the above numbered patent requiring correction and that the said Letters Patent should read as corrected below.

Column 2, line 28, for "mitigrate" read -- mitigate --; column 8, line 14, for "interring" read -- inter-ring --; column 9, line 75, for "processes" read -- process --; column 18, line 32, for "conventionall" read -- conventional line 59, before "treated" insert -- the --; column 21, line 39, for "flow-strengtened" read -- flow-straightened --.

Signed and sealed this 21st day of April 1959.

(SEAL)

Attest:

KARL H. AXLINE
Attesting Officer

ROBERT C. WATSON
Commissioner of Patents